United States Patent [19]

Nakajima et al.

[11] Patent Number: 4,831,446

[45] Date of Patent: May 16, 1989

[54] VIDEO SIGNAL OUTPUT SELECTION CIRCUIT

[75] Inventors: Tohru Nakajima; Hisao Nakamura, both of Saitama, Japan

[73] Assignee: Pioneer Electronic Corporation, Tokyo, Japan

[21] Appl. No.: 178,042

[22] Filed: Apr. 5, 1988

[30] Foreign Application Priority Data

Apr. 8, 1987 [JP] Japan ................................ 62-86431

[51] Int. Cl.⁴ ........................ H04N 5/04; H04N 5/268
[52] U.S. Cl. .................................... 358/181; 358/148
[58] Field of Search ................. 358/181, 185, 93, 148, 358/150, 151

[56] References Cited

U.S. PATENT DOCUMENTS 4,070,695 1/1978 Scholz ................................ 358/181
4,532,547 7/1985 Bennett .............................. 358/181

Primary Examiner—Tommy P. Chin

Attorney, Agent, or Firm—Sughrue, Mion, Zinn, Macpeak & Seas

[57] ABSTRACT

A video signal output circuit which permits switching an output video signal from one input video signal source to another without loss of synchronization of the video monitor. A first pulse signal is produced synchronized with the vertical synchronizing signal of the first video signal. A first detector circuit detects the phase difference between the first pulse signal and a second pulse signal synchronized with the vertical synchronizing signal of the second video signal, and the period of generation of the first pulse signal is controlled in response to the phase detected phase difference. A second phase detector detects when the phase difference between the first pulse signal and the second pulse signal is within a predetermined range easily tolerated by the monitor. Switching from the first to the second video source is permitted when this phase difference is within the predetermined range.

6 Claims, 2 Drawing Sheets

VIDEO SIGNAL OUTPUT SELECTION CIRCUIT

BACKGROUND OF THE INVENTION

The present invention relates to a video signal output apparatus suitable for use in a video disk player.

FIG. 1 is a block diagram showing a conventional video signal output apparatus used in a video disk player. Reference numeral 1 designates a video signal generator circuit constituted by, for example, a video signal processor, a frame memory, or the like, and arranged to generate a video signal, and 2 designates a video signal generator circuit constituted by, for example, a disk reproducing circuit or the like, and arranged to generate a video signal similar to the circuit 1. The generator circuit 2 supplies a control signal (an inhibit signal) to a control circuit 5, for example, before a CAV disk is started, or before a predetermined frame is searched in scanning a CLV disk. The control circuit 5 changes over a switch 3 to connect it to the generator circuit 1 before the generator circuit 2 is enabled to produce a video signal, so that the video signal produced by the generator circuit 1 is displayed through the switch 3 by a display 4 constituted by a television image receiver or the like.

The generator circuit 2 reverses the control signal (to produce an enable signal) when the generator circuit 2 is enabled to produce a video signal. At that time, the control circuit 5 changes over the switch 3 to connect it to the generator circuit 2. As a result, in place of the video signal produced by the generator circuit 1, the video signal produced by the generator circuit 2 is selected and displayed by the display 4 through the switch 3.

Thus, the video signal from the generator circuit 1 is displayed before the generator circuit 2 is enabled to produce a video signal so as to prevent the display 4 from being in a nondisplaying state.

As described above, the conventional apparatus is arranged such that, as soon as the generator circuit 2 is enabled to produce a video signal, the video signal from the generator circuit 2 is immediately outputted in place of the video signal from the generator circuit 1. However, there is a disadvantage in that the vertical synchronizing signal of the video signal of the generator circuit 2 is not always in phase with the vertical synchronizing signal of the video signal of the generator circuit 1 and the displayed picture is disturbed by the phase difference between the respective vertical synchronizing signals at the point of time when changeover is performed.

It is therefore an object of the present invention to prevent a displayed picture from being disturbed at the time of changeover.

SUMMARY OF THE INVENTION

According to the present invention, a video signal output apparatus is provided comprising a first video signal generator circuit for generating a first video signal; a second video signal generator circuit for generating a second video signal; a switch for selecting one of the first and second video signals as an output thereof; a pulse generator circuit for generating a first pulse signal synchronized with a vertical synchronizing signal of the first video signal; a first detector circuit for detecting a phase difference between the first pulse and a second pulse synchronized with a vertical synchronizing signal of the second video signal generated by the second generator circuit and for producing a control signal for controlling a period of generation of the first pulse signal in response to the phase difference; a second detector circuit for detecting the phase difference between the first and second pulse signals within a predetermined range; and a control circuit for controlling switching of the switch in response to an output of the second detector circuit.

One of the first and second video signals is selected by the switch for its output. The phase difference between the first pulse signal synchronized with the vertical synchronizing signal of the first video signal and the second pulse signal synchronized with the vertical synchronizing signal of the second video signal is detected, and the period of generation of the first pulse signal is controlled in response to the phase difference. When the phase difference between the first and second pulse signals reaches a value within a predetermined range, the switch is changed over so as to select as its output the second video signal in place of the first video signal.

DESCRIPTION OF THE PREFERRED EMBODIMENTS

Figure 1:
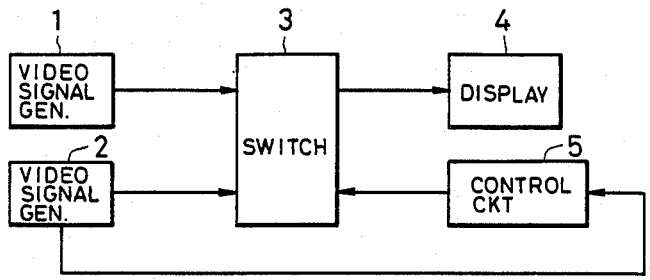
FIG. 1 is a block diagram showing a conventional video signal output circuit applied to a video disk player.
Figure 2:
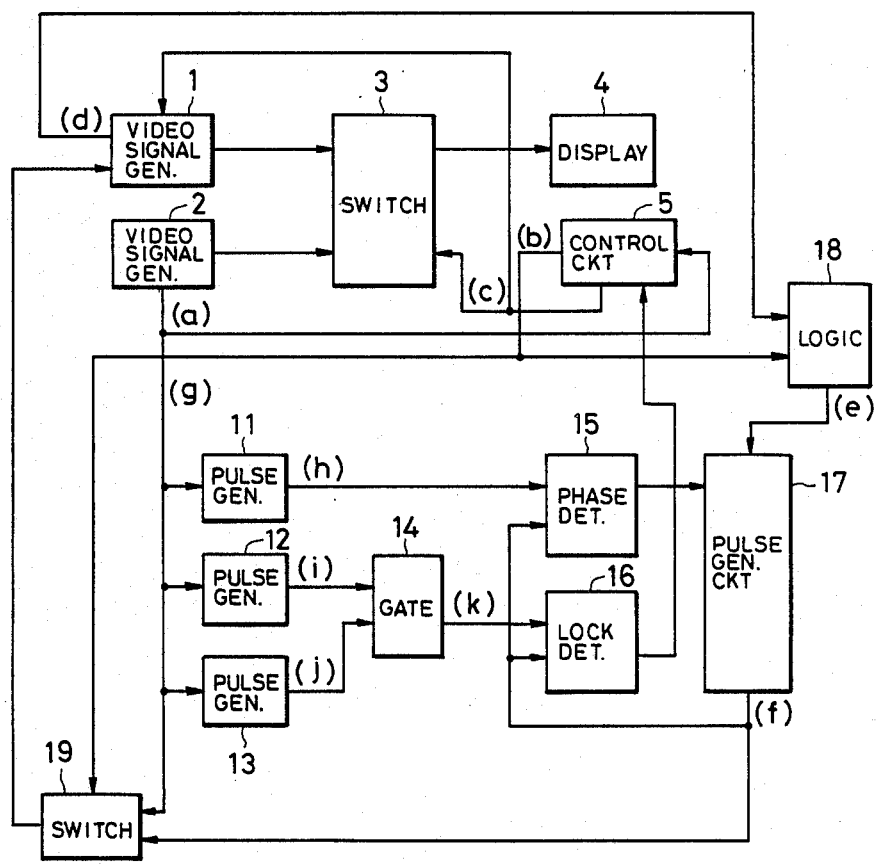
FIG. 2 is a block diagram showing a preferred embodiment of a video signal output circuit according to the present invention applied to a video disk player.

FIG. 2 is a block diagram showing a preferred embodiment of a video signal output apparatus according to the present invention, which is applied to a video disk player. In FIG. 2, parts corresponding to those in FIG. 1 are correspondingly referenced.

Figure 3A:
FIGS. 3A to 3L are a series of waveforms constituting a timing chart of the apparatus.
Figure 3B:
Figure 3C:
Figure 3D:
Figure 3E:
Figure 3F:

A control circuit 5 produces a selection signal (FIG. 3C) which causes a switch 3 to select the video signal (video signal A) produced by the generator circuit 1 so that the video signal produced by the generator circuit 1 is displayed by the display 4. In this condition, when an enable signal (FIG. 3A) indicating a ready state to output a video signal (video signal B) is produced by a video signal generator circuit 2, that is, when a low level is produced on the output of the generator circuit 2, the control circuit 5 supplies a lock-in mode signal at a low level (FIG. 3B) to a logic circuit 18. Upon reception of the lock-in mode signal, the logic circuit 18 produces a trigger signal (FIG. 3E) in synchronism with a vertical synchronizing signal (FIG. 3D) produced by the video signal generator circuit 1. A pulse generator circuit 17 receives the trigger signal, and in response thereto, generates and outputs a pulse signal with a predetermined period (FIG. 3F) in synchronization with the trigger signal. The period of the pulse signal (pseudo vertical synchronizing pulse signal) is set to a value $(16.7 + t_1)$ or $(16.7 - t_1)$ which is longer or shorter, respectively, by a predetermined period of time $t_1$ than the period of the vertical synchronizing signal (16.7 ms). While the control circuit 5 is producing the lock-in mode signal (FIG. 3B), a switch 19 is connected to the generator circuit 17 so that a pulse signal produced by the pulse generator circuit 17 is supplied to the video signal generator circuit 1 through the switch 19. When an enable signal (FIG. 3A), indicating a ready state to output a video signal B, is produced by the video signal generator circuit 2, the video signal generator circuit 1 resets the vertical synchronizing signal in synchronization with a pulse signal applied through the switch 19. As a result, the vertical synchronizing signal of the video signal produced by the video signal generator circuit 1 is synchronized with the pulse signal produced by the pulse generator circuit 17.

The video signal generator circuit 2 produces a pulse signal (FIG. 3G) synchronized with the vertical synchronizing signal of the video signal produced by the video signal generator circuit 2. A pulse signal generator circuit 11 produces a pulse signal (FIG. 3H) which changes in synchronism with the pulse signal produced by the video signal generator circuit 2 (FIG. 3G) about every half period (8.35 ms) of the vertical synchronizing signal. A phase difference detector circuit 15 detects the phase difference between the respective outputs of the video signal generator circuits 11 and 17. The phase difference detector circuit 15 produces a signal at a low level, for example, when the output pulse signal of the pulse generator circuit 17 is in a region where the output pulse signal of the pulse generator circuit 11 is at a high level, while the detector circuit 15 produces a signal at a high level when the output pulse signal of the pulse generator circuit 17 is in a region where the output pulse signal of the pulse generator circuit 11 is at a low level. The pulse generator circuit 17 extends the period of the pulse produced (into the period of 16.7 ms + $t_1$) upon the reception of a high-level signal from the detector circuit 15, while it shortens the period of the pulse (within the period of 16.7 ms − $t_1$) upon the reception of the low-level signal from the detector circuit 15. As a result, the output pulse signal (FIG. 3D) of the video signal generator circuit 1 is reset by an output pulse (FIG. 3F) from the generator circuit 17 so as to be phase-shifted to approach the phase of the output pulse signal (FIG. 3G) from the video signal generator circuit 2 so that the phase adjustment can be completed in a short time.

The above-mentioned operations are successively repeated so that the vertical synchronizing signal of the video signal generator circuit 1 is adjusted so as to be synchronized with the vertical synchronizing signal from the video signal generator circuit 2. In the adjustment, operation although the vertical synchronizing signal of the video signal produced by the video signal generator circuit 1 is relatively frequently reset, no disturbance occurs in the picture scene because the value $t_1$ is set to fall within a range where synchronization of the display 4 can be maintained.

Figure 3G:
Figure 3H:
Figure 3I:
Figure 3J:
Figure 3K:
Figure 3L:

A pulse signal generator circuit 12 generates a pulse (FIG. 3I) having a predetermined pulse width $t_2$ just after the output pulse (FIG. 3G) from the video signal generator circuit 2 in synchronization with the output pulse (FIG. 3G), and a pulse generator circuit 13 produces a pulse (FIG. 3J) having the same predetermined width $t_2$ just before the output pulse (FIG. 3G). When the respective outputs of the circuits 12 and 13 are applied to a gate circuit 14 constituted by, for example, a NAND gate, the gate circuit 14 generates and outputs a window pulse (FIG. 3K) having a width $\pm t_2$ before and after the output of the video signal generator circuit 2. A detector circuit 16 produces a lock signal (FIG. 3L) when the output pulse (FIG. 3F) from the circuit 17 is within the range of the window pulse (FIG. 3K). The range $\pm t_2$ is selected so that the phase difference can be readily tolerated by the display 4 that is, no that so significant disturbance occurs in the displayed picture. Accordingly, upon reception of the lock signal, the control circuit 5 reverses the selection signal (FIG. 3C), and causes the switch 3 to apply the video signal B produced by the circuit 2 to the display 4 so that the video signal B is displayed by the display 4.

When the video signal B is being produced and displayed, the control circuit 5 controls the switch 19 to cause the switch 19 to supply the output pulse (FIG. 3G) for the video signal generation circuit 2 to the video signal generator circuit 1. Accordingly, the vertical synchronizing signal of the video signal A produced by the video signal generator circuit 1 is synchronized with the vertical synchronizing signal of the video signal B produced by the video signal generator circuit 2. As a result, no disturbance occurs in the picture even if the switch 3 immediately changes over the video signal output selection from the video signal B to the video signal A.

As described above, according to the present invention, the video signal output circuit includes a first video signal generator circuit for generating a first video signal; a second video signal generator circuit for generating a second video signal; a switch for selecting one of the first and second video signals as an output thereof; a pulse generator circuit for generating a first pulse signal synchronized with the vertical synchronizing signal of the first video signal; a first detector circuit for detecting a phase difference between the first pulse signal and a second pulse signal synchronized with the vertical synchronizing signal of the second video signal generated by the second video signal generator circuit and for producing a control signal for controlling a period of generation of the first pulse signal in response to the phase difference; a second detector circuit for detecting the phase difference between the first and second pulse signals within a predetermined range; and a control circuit for controlling the switching of the switch in response to an output of the second detection circuit. Accordingly, with this arrangement the picture is prevented from being disturbed when the video signal is changed over.

What is claimed is:
1. A video signal output circuit comprising:
   a first video signal generator circuit for generating a first video signal;
   a second video signal generator circuit for generating a second video signal;
   a first switch for selecting one of said first and second video signals as an output of said video output circuit;
   a first pulse generator circuit for generating a first pulse signal synchronized with a vertical synchronizing signal of said first video signal;
   a second pulse generator circuit for generating a second pulse signal synchronized with a vertical synchronizing signal of said second video signal;
   a first detector circuit for detecting a phase difference between said first pulse signal and said second pulse signal, said first pulse generator circuit having means for controlling a period of generation of pulses of said first pulse signal in response to the phase difference detected by said first detector circuit;
   a second detector circuit for detecting when said phase difference between said first and second pulse signals is within a predetermined range; and a control circuit for controlling switching of said first switch in response to an output of said second detector circuit.

2. The video signal output circuit of claim 1, further comprising display means for displaying the first and second video signals, and wherein said predetermined range represents a range of the phase differences between respective vertical synchronizing signals of the first and second generated video signals which are readily tolerated by said display means.

3. The video signal output circuit of claim 1, further comprising means for supplying said vertical synchronizing signal of said second video signal generator circuit to said first video signal generator circuit for synchronizing said first video signal generator circuit with said second video signal generator circuit.

4. The video output circuit of claim 1, wherein said first video signal generating circuit includes phase-shifting means for shifting the phase of the vertical synchronizing signal of said first video signal in response to the output of said first pulse generator circuit.

5. The video output circuit of claim 4, further comprising a second switch connected between said first pulse generator and said first video signal generator, and wherein said second video signal generator circuit includes means for generating an enable signal which indicates that said second video signal generator is in a ready state to output the second video signal, and wherein said control circuit includes means for controlling switching of said second switch in response to the enable signal.

6. The video output circuit of claim 1, further comprising:
a third pulse generator circuit for generating respective first output pulses in response to the vertical synchronizing signals of said second video signal, each of said first output pulses having a predetermined period;
a fourth pulse generator circuit for generating respective second output pulses in response to the vertical synchronizing signals of said second video signal, each of said second output pulses having the predetermined period of the output pulses of said third pulse generator circuit;
said third pulse generator circuit generating said first output pulse at times such that the trailing edges thereof substantially coincides with respective leading edges of the vertical synchronizing signals of said second video signal;
said fourth pulse generator circuit generating said second output pulses at times such that the leading edges thereof substantially coincides with respective trailing edges of the vertical synchronizing signals of said second video signal; and
gate means for supplying pulse signals to said detector circuit in response to said first and second output pulses, the pulse signals supplied to said detector circuit from said gate means having a period equal to twice the predetermined period and corresponding to the predetermined range.

* * * * *